US007921028B2

(12) United States Patent
Cole

(10) Patent No.: US 7,921,028 B2
(45) Date of Patent: Apr. 5, 2011

(54) SYSTEMS AND METHODS OF PARTNERING CONTENT CREATORS WITH CONTENT PARTNERS ONLINE

(75) Inventor: Douglas W. Cole, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1748 days.

(21) Appl. No.: 11/103,696

(22) Filed: Apr. 12, 2005

(65) Prior Publication Data

US 2006/0229893 A1    Oct. 12, 2006

(51) Int. Cl.
G06F 17/30    (2006.01)
(52) U.S. Cl. ............... 705/10; 705/1; 705/7; 705/11
(58) Field of Classification Search ............. 705/51–79, 705/7, 10
See application file for complete search history.

(56) References Cited

U.S. PATENT DOCUMENTS

| | | | |
|---|---|---|---|
| 5,592,375 A | 1/1997 | Salmon et al. | |
| 6,226,618 B1 * | 5/2001 | Downs et al. | 705/1 |
| 6,343,273 B1 * | 1/2002 | Nahan et al. | 705/5 |
| 6,691,133 B1 * | 2/2004 | Rieffanaugh, Jr. | 1/1 |
| 6,754,874 B1 * | 6/2004 | Richman | 715/205 |
| 6,785,661 B1 | 8/2004 | Mandler et al. | |
| 7,107,268 B1 * | 9/2006 | Zawadzki et al. | 707/9 |
| 7,110,983 B2 * | 9/2006 | Shear et al. | 705/55 |
| 7,130,807 B1 * | 10/2006 | Mikurak | 705/7 |
| 7,162,433 B1 * | 1/2007 | Foroutan | 705/11 |
| 7,162,508 B2 * | 1/2007 | Messina | 709/200 |
| 7,301,093 B2 * | 11/2007 | Sater et al. | 84/615 |
| 7,515,873 B2 * | 4/2009 | Brown et al. | 455/3.01 |
| 7,533,090 B2 * | 5/2009 | Agarwal et al. | 1/1 |
| 2001/0044781 A1 * | 11/2001 | Shutes | 705/59 |
| 2002/0029272 A1 * | 3/2002 | Weller | 709/226 |
| 2002/0120501 A1 * | 8/2002 | Bell et al. | 705/14 |
| 2003/0198337 A1 * | 10/2003 | Lenard | 379/265.14 |
| 2003/0237087 A1 * | 12/2003 | Kurapati et al. | 725/9 |
| 2005/0004978 A1 * | 1/2005 | Reed et al. | 709/203 |
| 2005/0076365 A1 * | 4/2005 | Popov et al. | 725/46 |
| 2005/0097613 A1 * | 5/2005 | Ulate et al. | 725/86 |
| 2005/0131918 A1 * | 6/2005 | Hillis et al. | 707/100 |
| 2005/0193054 A1 * | 9/2005 | Wilson et al. | 709/200 |
| 2006/0242072 A1 * | 10/2006 | Peled et al. | 705/51 |
| 2007/0073596 A1 * | 3/2007 | Alexander et al. | 705/26 |
| 2008/0091571 A1 * | 4/2008 | Sater et al. | 705/26 |
| 2008/0133298 A1 * | 6/2008 | McQueen et al. | 705/7 |
| 2008/0261220 A1 * | 10/2008 | Cracauer et al. | 435/6 |

OTHER PUBLICATIONS

All about AandROnline, http://www.AandROnline.com/Intro.html, copyright 2000-2004. 3 pages.

(Continued)

*Primary Examiner* — Evens J Augustin
*Assistant Examiner* — Mamon Obeid

(57) ABSTRACT

Systems and methods of partnering content creators with content partners online are disclosed. In an exemplary implementation a method may include receiving registration information from a content partner and building a profile describing desired creative content for the content partner and receiving creative content. Based on at least the profile, the method may include determining whether a match exists between a content partner and the creative content. If a match is found, the method may include providing the content partner access to the creative content, and extending an invitation for the content partner to acquire rights in the creative content.

28 Claims, 8 Drawing Sheets

OTHER PUBLICATIONS

"AtomShockwave Home", http://www.atomshockwave.com, available on the Internet at least as early as Apr. 10, 2005. 1 page.

"Project Greenlight", http://projectgreenlight.liveplanet.com/index.jsp?nav=home, copyright 2004. 2 pages.

"Corbis—Overview", http://www.corbis.com/corporate/overview/overview.asp, copyright 2004, 1 page.

"Corbis—Technology", http://www.corbis.com/corporate/overview/Technology.asp, copyright 2004, 1 page.

"Corbis—Services", http://www.corbis.com/corporate/overview/Services.asp, copyright 2004, 1 page.

iUniverse Book Publishing Company, "Book Publishing Begins with iUniverse", http://iuniverse.com, copyright 2004, 1 page.

iUniverse Book Publishing Company, "Book Publishing: Publish a Book Today!", http://iuniverse.com, copyright 2004, 1 page.

* cited by examiner

US 7,921,028 B2

SYSTEMS AND METHODS OF PARTNERING CONTENT CREATORS WITH CONTENT PARTNERS ONLINE

RELATED APPLICATIONS

This application contains subject matter related to co-owned U.S. patent application for "Systems and Methods of Brokering Creative Content Online" of Douglas W. Cole Ser. No. 11/103,793 filed on the same day herewith and incorporated herein for all that is disclosed.

TECHNICAL FIELD

The described subject matter relates to creative content, and more particularly to systems and methods of partnering content creators with content partners online.

BACKGROUND

In order for many artists to be successful, at least financially, they need backing from the art industry, such as, e.g., recording companies, network/cable television, movie producers, art dealers, or publishing houses. However, submitting creative works (e.g., paintings, photographs, movie or television scripts, literary compilations, music, and other artwork) to those working in the art industry is often difficult and discouraging for the typical artist. Much of the art industry will only deal with agents, and the best agents have exclusive client lists. Therefore, unless the artist has "connections" (e.g., family members or close personal friends) in the art industry or happens to be "discovered" by someone in the art industry, the artist's work may go unnoticed.

Artists may gain exposure in the art industry by participating in contests or talent shows. Although the top contestants may receive a contract or be introduced to top agents, ultimately the goal of such contests is for the contest sponsor to "discover" new talent. The other contestants may receive a consolation prize and their ranking relative to the other contestants (e.g., fifth place), but are otherwise turned away. The artists typically do not receive any substantive feedback for improving their creative works.

The Internet has also provided a medium for some artists to present and/or sell their creative works. Internet sites include online galleries for posting pictures, online music stores for posting music, and even online publishers. However, these Internet sites only provide the artist with a forum for presenting and/or selling their creative works over the Internet. The owners of these Internet sites typically do not work with agents or others in the art industry. Nor do the artists receive any substantive feedback for improving their creative works.

DETAILED DESCRIPTION

Briefly, systems and methods described herein may be implemented as an "online agent" to broker any of a wide variety of creative works to consumers, commercial content distributors, content developers, agents, and others in the relevant industry in a secure, timely, and cost-effective manner. Exemplary systems and methods may be implemented on at least two levels to provide feedback to content creators based on peer review and/or industry review of their creative content. Content creators may also be matched with one or more content partners (e.g., agents, studios, and buyers).

In an exemplary embodiment, a content creator (i.e., either the artist or a person acting on behalf of the artist) uploads creative content in electronic format to a host for brokering the creative content online (generally referred to herein as the "brokering service"). The content creator may agree to review at least a portion of creative content (e.g., abstracts, summaries, or the entire work) posted by other users in exchange for peer review of his or her own creative content. Alternatively, the content creator may request (e.g., for a fee) to have his or her creative content reviewed by a contract reviewer, such as an industry expert or other qualified reviewer. In any event, the content creator receives feedback based on the review.

In another exemplary embodiment, creative content may be reviewed using a multi-tiered approach, wherein creative content that satisfies an initial approval threshold (e.g., 60% peer approval rating) may then be reviewed at a higher tier (e.g., by professional reviewers).

In other exemplary embodiments, the broker service may facilitate a sale of the creative content, or even a partnership between the content creator and an agent or studio. At least a portion of creative content (e.g., abstracts, summaries, or the entire work) may be provided to agents and buyers on a first-come, first-served basis to pique their interest and instill a sense of urgency for purchasing the creative content or representing the content creator as his or her agent.

In still other exemplary embodiments, a fee structure may be implemented wherein a fee is charged for receiving and storing the user's creative content, for reviewing creative content, and/or for partnering the content creator with an agent or buyer. Fees may also be charged to content partners, e.g., for providing access to "fresh" creative content.

It is noted that operations described herein may be embodied as logic instructions on a computer-readable medium. When executed on a processor, the logic instructions cause a general purpose computing device to be programmed as a special-purpose machine that implements the described operations.

Exemplary Systems

Figure 1:
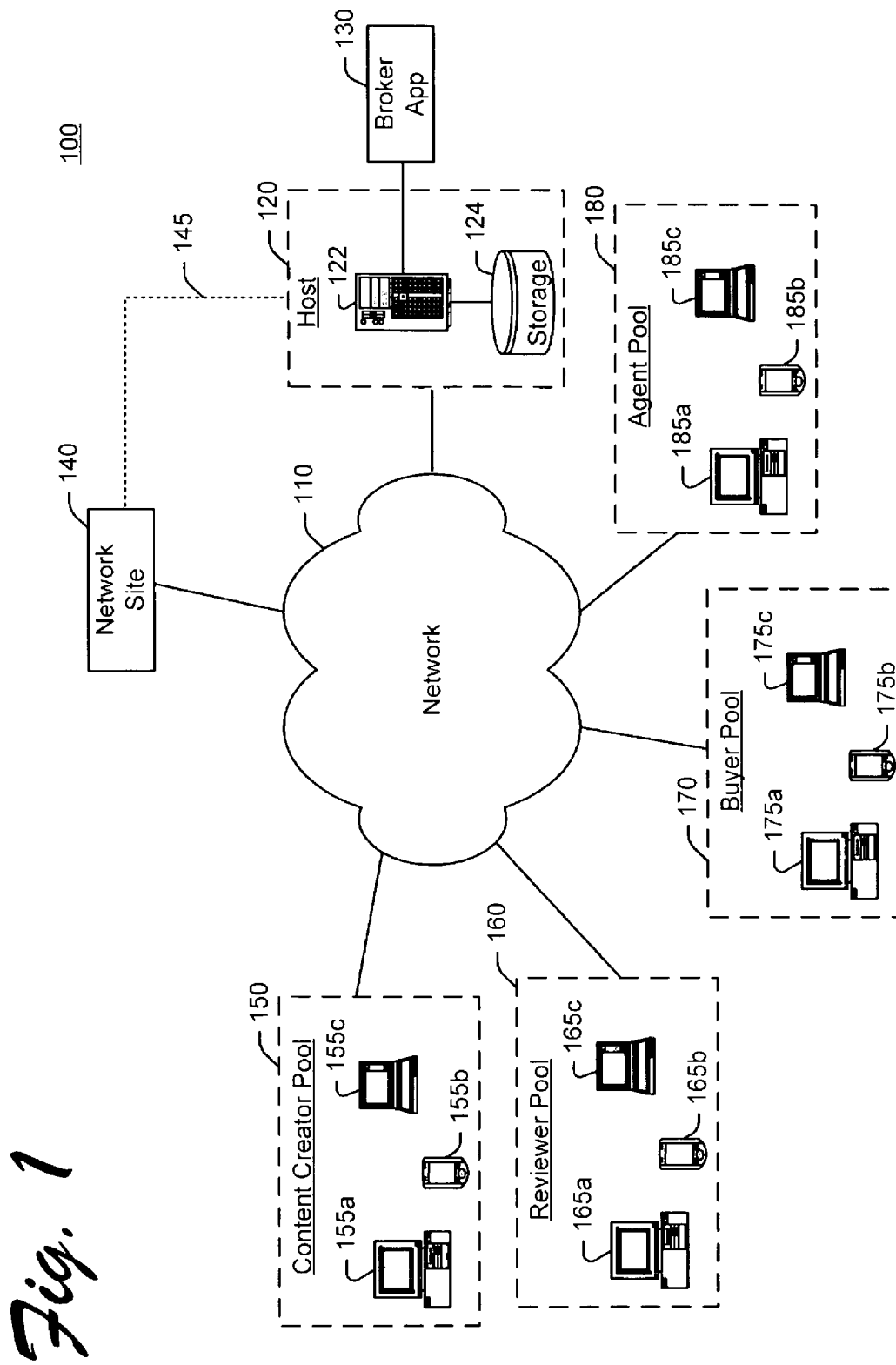
FIG. 1 is a high-level illustration of an exemplary networked computer system which may be implemented for brokering creative content online.

FIG. 1 is a high-level illustration of an exemplary networked computer system 100 (e.g., the Internet) which may be implemented for brokering creative content online. The networked computer system 100 may include one or more communication networks 110, such as a local area network (LAN) and/or wide area network (WAN). A host 120 may be implemented in the networked computer system 100 to broker any of a wide variety of creative content online.

Host 120 may include one or more computing systems, such as a server 122 with computer-readable storage 124. Host 120 may execute a broker application 130 implemented in software, as described in more detail below with reference to FIG. 2. Host 120 may also provide services to other computing or data processing systems or devices. For example, host 120 may also provide transaction processing services, email services, etc.

Host 120 may be provided on the network 110 via a communication connection, such as a dial-up, cable, or DSL connection via an Internet service provider (ISP). Host 120 may be accessed directly via the network 110, or via a network site 140. In an exemplary embodiment, network site 140 may also include a web portal on a third-party venue (e.g., a commercial Internet site), which facilitates a connection for one or more clients with host 120 (e.g., via back-end link 145). In another exemplary embodiment, portal icons may be provided (e.g., on third-party venues, pre-installed on computer or appliance desktops, etc.) to facilitate a direct link to the host 120.

The term "client" as used herein refers to a computing device through which one or more users (e.g., content creators and content partners) may access the broker service. For purposes of illustration, users may include one or more content creators in a content creator pool 150 (e.g., accessing network 110 via computing devices 155a-c), one or more reviewers in a reviewer pool 160 (e.g., accessing network 110 via computing devices 165a-c), one or more buyers in a buyer pool 170 (e.g., accessing network 110 via computing devices 175a-c), and/or one or more agents in an agent pool 180 (e.g., accessing network 110 via computing devices 185a-c).

Before continuing, it is noted that client computing devices 155-185 may include any of a wide variety of computing systems, such as a stand-alone personal desktop or laptop computer (PC), workstation, personal digital assistant (PDA), or appliance, to name only a few examples. Each of the client computing devices may include memory, storage, and a degree of data processing capability at least sufficient to manage a connection to the broker application 130 either directly via network 110 to host 120 or indirectly (e.g., via network site 140). Client computing devices may connect to network 110 via a communication connection, such as a dial-up, cable, or DSL connection via an Internet service provider (ISP).

In an exemplary embodiment, a content creator 150 may upload his or her creative content to the host 120. Broker application 130 processes the creative content and delivers the creative content to one or more other users. For example, one or more peer reviewers and/or contract reviewers (e.g., industry experts or other qualified reviewers) in the reviewer pool 160 may be invited (e.g., via email) to review the creative content. The broker application 130 may process the reviews and provide feedback to the content creator. In another example, one or more content partners (e.g., buyers 170 or agents 180) may be invited to review, purchase rights to the creative content, etc. The broker service may also facilitate a partnership between the content creator and the content partner.

It is noted that the client "pools" 150-180 in FIG. 1 are shown only for purposes of illustration and are not intended to be limiting. For example, in addition to "dedicated" (or contract) reviewers, a reviewer may also be a member of the content creator pool 150, the buyer pool 170 and/or the agent pool 180.

Figure 2:
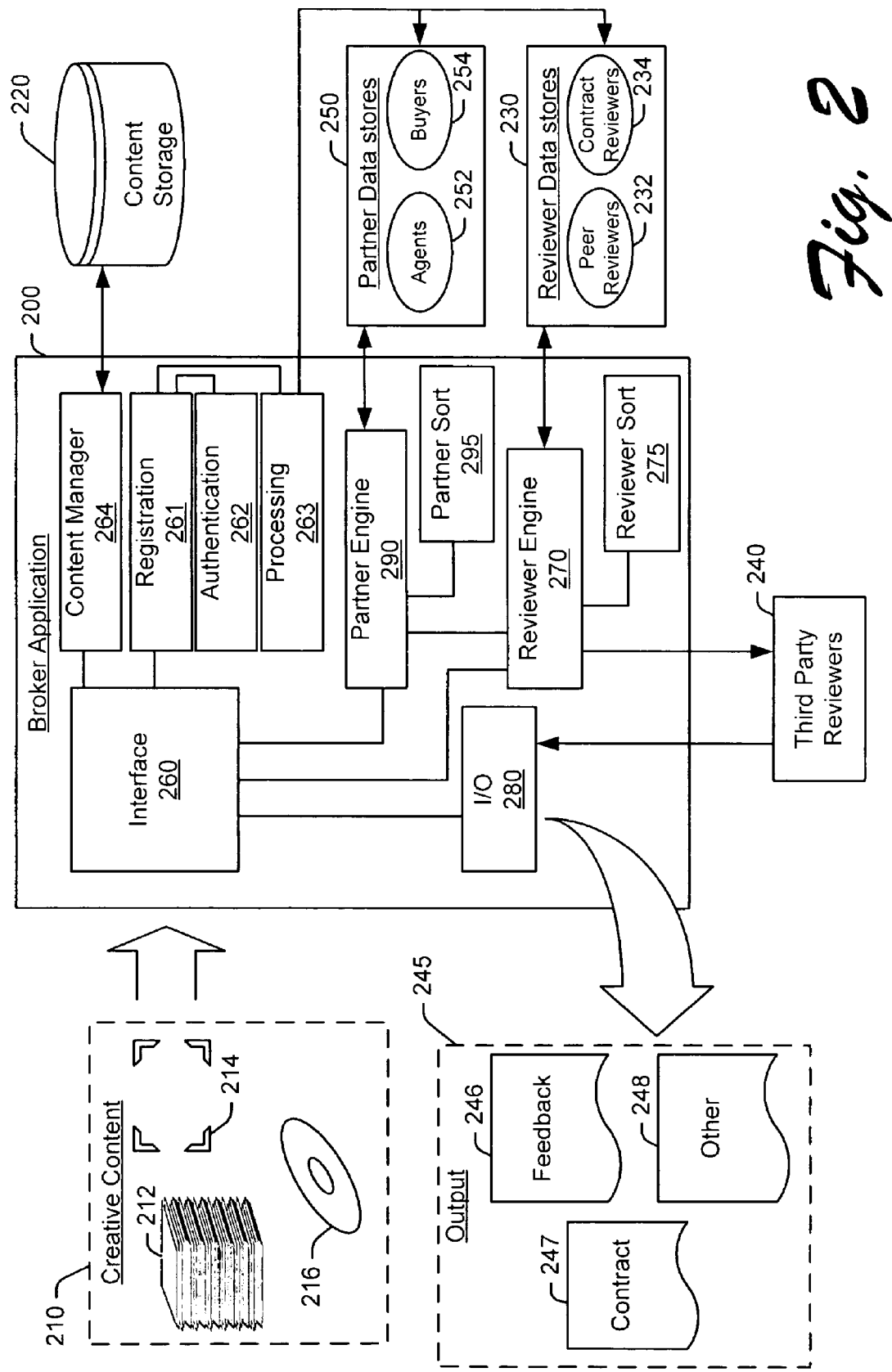
FIG. 2 is a schematic illustration of exemplary functional modules of a broker service.

FIG. 2 is a schematic illustration of functional modules of a broker application. Exemplary broker application 200 may be implemented in computer-readable program code executable by one or more computing systems in a network such as, e.g., the Internet. For example, broker application 200 may be a web-based application executing at a network server (e.g., server 122 in FIG. 1) and various functional modules may be implemented as applets executing at a computing device (e.g., computing devices 155-185 in FIG. 1). In an exemplary embodiment, broker application 200 may provide means for building a profile describing desired creative content for a content partner; means for providing a score based on at least one review of the creative content; means for determining whether a match exists between a content partner and creative content based on at least the profile and the score; means for providing the content partner access to the creative content if a match is found; and means for extending an invitation for the content partner to acquire tights in the creative content if a match is found.

Briefly, broker application 200 may receive creative content 210 from a user in electronic format (e.g., jpg for graphics, pdf for text, mpeg for audio/visual). Creative content 210 may include, for example, but is not limited to literary compilations or television/movie scripts 212, photographs or paintings 214, audio and/or video works 216, or any of a wide variety of other works.

Creative content 210 may be stored in computer-readable storage 220, where it may be accessed by the broker application 200. For example, broker application 200 may access creative content 210 and provide it to reviewers, agents, studios, and/or buyers. The creative content 210 may be stored for a predetermined duration, allowing users to search online archives of creative content. The creative content 210 may be purged after a predetermined time to free storage.

Broker application 200 may also generate a variety of output 245 for the user. For example, broker application 200 may compile feedback 246 for the content providers based on review of the creative content 210. Broker application 200 may also generate contracts 247 for facilitating a partnership between a content creator and content partner. Other output 248 may also be provided to a user, such as, e.g., sales materials, contact information, reports, etc.

Broker application 200 may be implemented as one or more functional modules, as illustrated in FIG. 2. In an exemplary embodiment, broker application 200 may include an interface module 260. Interface module 260 may include a graphical user interface (GUI), e.g., in a web browser. Interface module 260 may be provided to interface with users.

Interface module 260 may be operatively associated with a number of different modules. For example, interface module 260 may be operatively associated with a registration module 261 to register users with the broker service, an authentication module 262 to verify a user's credential during registration, and a processing module 263 for processing the registration and generating a user profile (see, e.g., FIG. 3). Interface module 260 may also be operatively associated with other functional modules (not shown), such as, e.g., a payment processing module for implementing a fee structure for the broker service.

Registration module 261 may be implemented to register one or more users with the broker service. For example, users may register as content creators who submit creative content, reviewers who review creative content and provide feedback to the content creator, agents or studios who may be interested in representing content creators, and/or buyers who may be interested in purchasing creative content.

During registration, the broker application 200 may receive information about the user. Content creators may also be required to agree to a terms of use policy and/or legal disclaimer before receiving the creative content 210. In an exemplary embodiment, the user may also be provided with basic information on protecting his or her intellectual property rights in the creative content before receiving the creative content 210. Content partners may also be required to agree to a terms of use policy and/or legal disclaimer, e.g., regarding the artist's rights.

Broker application 200 may use the user registration to build one or more reviewer data stores 230 for inviting reviewers 240. Reviewers 240 may register with the broker service to be listed in the reviewer data stores 230. In an exemplary embodiment, other artists may register as peer reviewers 232, and agents, buyers, or other industry experts may register as contract reviewers 234. Peer reviewers 232 may receive free or reduced rate review of their own creative content in exchange for registering as a peer reviewer. Contract reviewers 234 may be paid or receive other benefits for reviewing creative content. By way of example, other benefits may include agents or buyers having priority access to fresh creative content before others in the industry have access to it.

Broker application 200 may also use the client registration to build one or more partner data stores 250 for matching the user with a content partner (e.g., an agent or buyer). Content partners may register with the broker application 200 to be listed in the partner data stores 250. In an exemplary embodiment, agents, buyers, other industry experts, and even other artists may register as content partners. Partners may register under one or more categories (e.g., by genre). Partners may be selected based on any number of criteria. For example, a content partner may receive priority access to the creative content (e.g., for bidding) if the content partner previously reviewed the creative content. Partners may also pay a fee for a higher position in the partner data store 250.

Optionally, the broker application 200 may also receive information about the creative content 210 being submitted. This registration information may be used to categorize and better manage the creative content 210 and to invite reviewers, agents (or studios), and buyers having a relevant background to review, purchase, etc. the creative content 210. In another exemplary embodiment, broker application 200 uses registration information to aid in identifying creative content 210 as average, good, or excellent (e.g., based on the content creator's background or prior submission history) inviting reviewers to review the creative content 210.

Broker application 200 may also include a content manager 264 for managing creative content 210 that is received from content creators, e.g., after registration. For example, content manager 264 may be implemented to import creative content 210 in electronic format, store the creative content 210 in content storage 220, and invite reviewers and/or partners to review, offer to buy, etc. the creative content 210.

Broker application 200 may also include a reviewer engine 270. Reviewer engine 270 may be operatively associated with reviewer data stores 230 to identify reviewers (e.g., peer reviewers 232 or contract reviewers 234). Reviewer engine 270 may include a reviewer sort module 275 to identify reviewers listed in the reviewer data stores 230 and invite reviewers to review creative content 210.

Reviewers 240 may provide their reviews of the creative content 210 to the broker application 200 for processing. In an exemplary embodiment, the review may include a content ranking (e.g., on a scale of 1 to 10) in one or more categories (e.g., sound or video quality, overall presentation). The review may be received from the reviewers 240 at I/O 280 and processed to compiling feedback 246 for the user. Broker application 200 may deliver the feedback 246 to the user, e.g., via email, notification upon login, or by the user accessing a webpage to view the feedback 246.

Broker application 200 may also include a partner engine 290. Partner engine 290 may be operatively associated with partner data stores 250 to identify content partners (e.g., agents 252 or buyers 254) for the user's creative content. Partner engine 290 may include a partner sort module 295 to identify partners listed in the partner data stores 250. Operation of the partner engine 290 and partner sort module 295 is similar to operation of the reviewer engine 270 and reviewer sort module 275, and both are explained in more detail below with reference to FIG. 4.

Broker application 200 may also be implemented to partner a user and content partner (e.g., agent or buyer). In an exemplary embodiment, broker application 200 may deliver contact information for the user to the potential agent or vice versa. Alternatively, broker application 200 may mediate communication between the user and content partner (e.g., to protect the anonymity of either or both the user and partner). In another exemplary embodiment, broker application 200 may deliver the contact information for both parties to an advisor (e.g., one or more attorneys) to handle further interactions (e.g., contract negotiations) for the user and content partner.

It is noted that exemplary broker application 200 is shown and described herein for purposes of illustration and is not intended to be limiting. For example, the functional components shown in FIG. 2 do not need to be encapsulated as separate modules. In addition, other functional components (not shown) may also be provided and are not limited to those shown and described herein.

Figure 3:
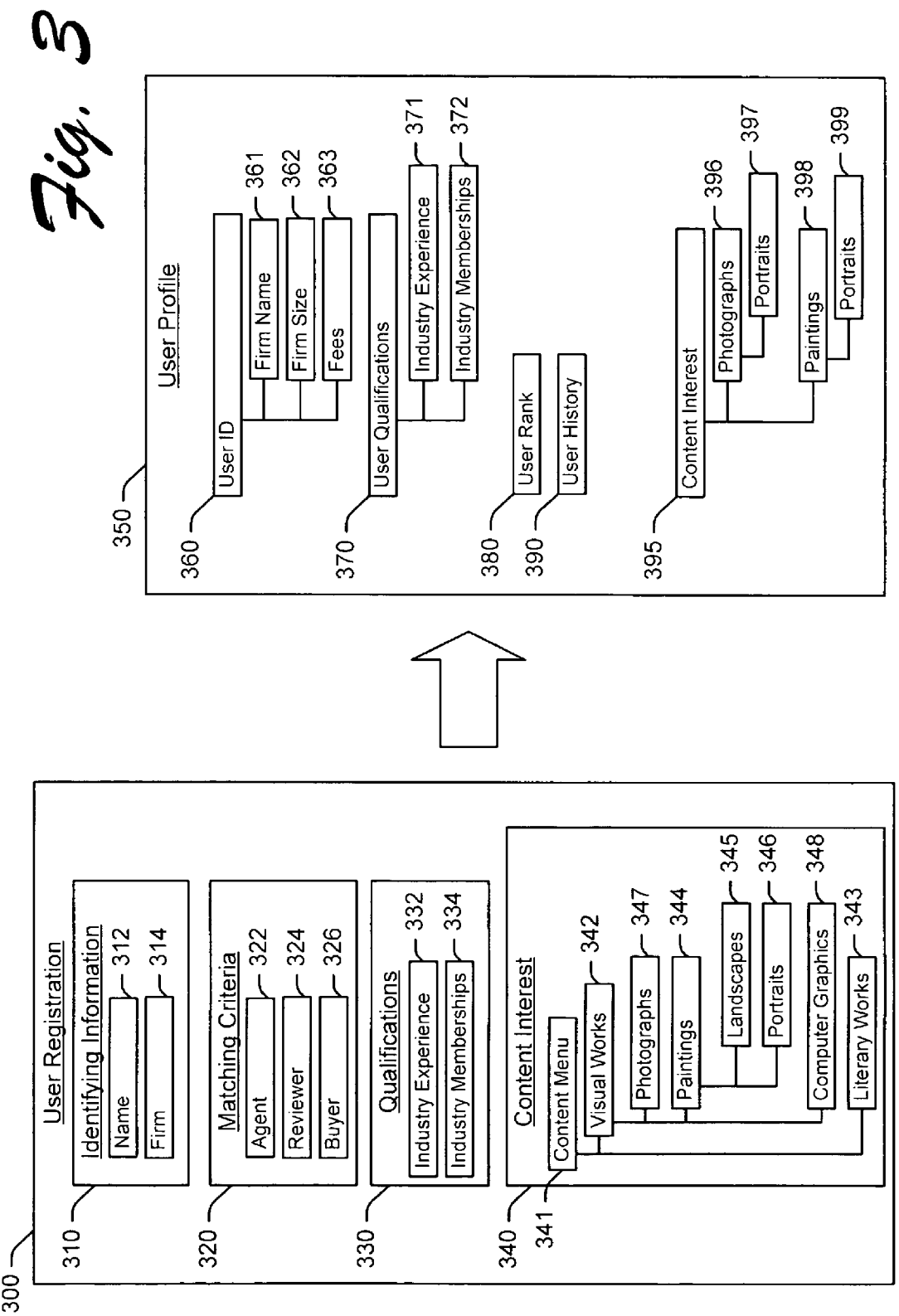
FIG. 3 is a block diagram illustrating exemplary user registration and corresponding user profile for a broker service.

FIG. 3 is a block diagram illustrating a user registration and corresponding user profile. Exemplary user registration 300 may be generated as part of an interactive registration process between the broker service and a user, such as, e.g., by the user entering data into form fields in an electronic form provided by the broker service on an Internet site. The user registration 300 and user profile 350 may be implemented, e.g., to register a user with the broker service as a content provider, a reviewer, and/or a content partner.

User registration 300 may include one or more data categories. Exemplary data categories may include, but are not limited to, identifying information 310, matching criteria 320, qualifications 330, and content interest 340. It is noted that any number of data categories 310-340 may be provided to solicit information from a user registering with the broker service.

Data categories 310-340 may also include one or more subcategories. For purposes of illustration, the identifying information data category 310 may include a name subcategory 312 (for the user's name) and a firm subcategory 314 (for an agency name, if applicable). Other subcategories (not shown) in the identifying information data category 310 may include, e.g., mailing address, email address, telephone number, etc.

The matching criteria category 320 enables the user to select one or more types of registration, e.g., as an agent 322, a reviewer 324, and/or a buyer 326. The qualifications category 330 requests the user to specify, e.g., industry experience 332, and industry memberships 334.

The content interest category 340 enables the user to select one or more types of creative content the user is interested in receiving. In an exemplary embodiment, content interest category 340 may be implemented as a menu structure 341. The user may click on types of content (e.g., visual works 342 or literary works 343) to display a more detailed listing of content available from the broker service. In FIG. 3, for example, the user has selected visual works 342, and then paintings 344, to display landscapes 345 and portraits 346. Likewise, the user could select photographs 347 or computer graphics 348.

Before continuing, it is noted that the user registration 300 in FIG. 3 is shown for purposes of illustration only, and is not intended to be limiting in scope. Although providing more detailed data during the registration process may allow the broker service to better match the user with creative content, the user registration 300 is not limited to any particular format or level of detail.

The user registration 300 may be processed to generate a user profile 350. User profile 350 may be implemented as a computer readable data structure (e.g., an XML file) including a number of data fields. In an exemplary embodiment, data fields may include a user ID field 360, user qualifications field 370, user rank field 380, user history field 390, and content interest field 395.

The fields 360-395 may be generated based on registration data provided by the user, e.g., in the user registration 300. The registration data may also be included in subfields corresponding to each of the fields 360-395. For example, the user ID field 360 may include subfields 361-363 and user qualifications field 370 may include subfields 371-372. More than one level of subfields may also be included. For example, the content interest field 395 may include a photographs subfield 396 and, under that, a portraits subfield 397. Subfields 398, 399 are also shown for purposes of illustration.

In an exemplary embodiment, the user rank 380 may be determined by the broker service based on registration data provided by the user, e.g., in the user registration 300. For example, an agent's rank may be based on how long the agent has been registered with the broker service (e.g., agent history), prior successes in the industry, prior successes with the broker service, industry memberships and other qualifications, standing in the industry, user feedback, credibility (e.g., an agent specializing in cartoons may not be a credible agent for horror films), fees charged, fees paid (e.g., a subscription to the broker service), and/or firm size, to name only a few examples. In another example, a buyer's rank may be based on how long the buyer has been registered with the broker service (e.g., buyer history), recent purchases using the broker service or otherwise, and price the buyer is willing to pay, to name only a few examples.

In another exemplary embodiment, the user history 390 may be generated by the broker service based on registration data provided by the user and/or during operation. For example, the user history 390 may be based on an agent's proclivity for negotiating contracts or a buyer's purchasing history. The user history 390 may be updated based on events occurring after the initial registration (e.g., a sale using the broker service).

The user profile 350 may be implemented by the broker service for a number of different purposes. For example, the broker service may access the user profile 350 to identify reviewers, agents, and/or buyers for creative content that has been submitted by a content creator. The broker service may also access the user profile 350 for an agent (or buyer) to determine an agent's (or buyer's) rank relative to other agents (or buyers) before inviting an agent (or buyer). The broker service may also access the user profile 350 to match the user with content (e.g., to review, purchase, or represent as an agent) based on the user's desires, qualifications, and/or experience. The user profile 350 may also be used to facilitate a relationship (e.g., between an agent and a content creator).

Figure 4:
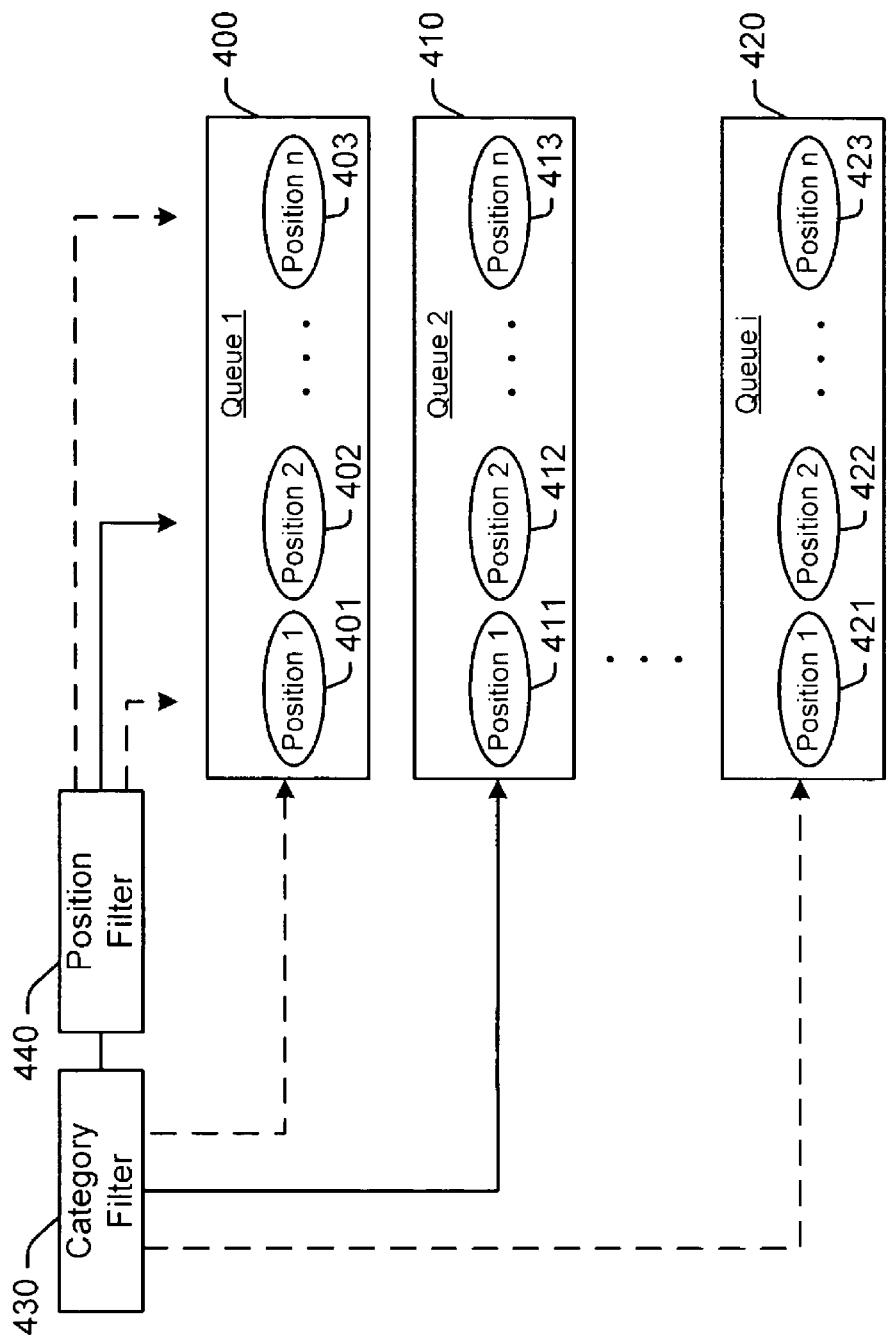
FIG. 4 is a high-level diagram illustrating exemplary queues for use with a broker service.

FIG. 4 is a high-level diagram illustrating queues for brokering creative content online. One or more queues 400, 410, and 420 may be implemented by the broker service to automatically categorize and invite reviewers and/or to match users with content partners.

Queues 400, 410, 420 may be populated with data entries. In an exemplary implementation, the data entries identify reviewers. Separate queues may be used for separate categories (and/or subcategories) so that a reviewer registered to receive creative content in a particular category (e.g., based on interest, experience, etc.) is placed into the corresponding queue. For purposes of illustration, reviewers registered for music may be placed into queue 400, reviewers registered for literary works may be placed into queue 410, and reviewers registered for visual art works may be placed into queue 420. Of course any number of queues and sub-queues may be implemented (e.g., for different genre within a category such as music).

Broker service may include one or more sort modules (e.g., reviewer sort 275 in FIG. 2) to automatically identify reviewers using one or more filters in conjunction with the queues 400, 410, 420. In an exemplary embodiment, the broker service may automatically determine a category of the creative content (e.g., based on file extension, user responses provided in a survey, etc.). The category (and/or subcategory) may be passed to a category filter 430 which "points" to one or more queues corresponding to the category (and/or subcategory). Once the appropriate queue(s) have been selected by the category filter 430, a position filter 440 "points" to one or more position within the selected queue (e.g., queue position 412 in FIG. 4) to identify a reviewer for the creative content. In an exemplary implementation, the position filter 440 "points" to a position in the queue based on a first-in first-out (FIFO) or round robin scheme, although other algorithms may also be implemented (e.g., based on the reviewer's experience, history with the brokering system, a fee-basis, etc.). Queue position 412 may also include contact information (e.g., an email or physical address) for the reviewer enabling the broker service to invite the identified reviewer. Alternatively, the user profile may be invoked to retrieve contact information.

It is noted that a similar queuing mechanism may be implemented for identifying content partners. That is, content partners may register in one or more categories (e.g., based on interest, experience, etc.) and be listed in the corresponding queue. Again, the content partner's position in the queue may be determined on a FIFO basis or other suitable algorithm (e.g., paid subscribers may receive a higher position in the queue than non-paying subscribers). In an exemplary implementation, it is in the interest of the content partner to be selected more frequently and ahead of other content partners to increase their odds of discovering "new talent."

It is noted that the exemplary systems discussed above are provided for purposes of illustration. Still other implementations are also contemplated.

Exemplary Operations

Figure 5:
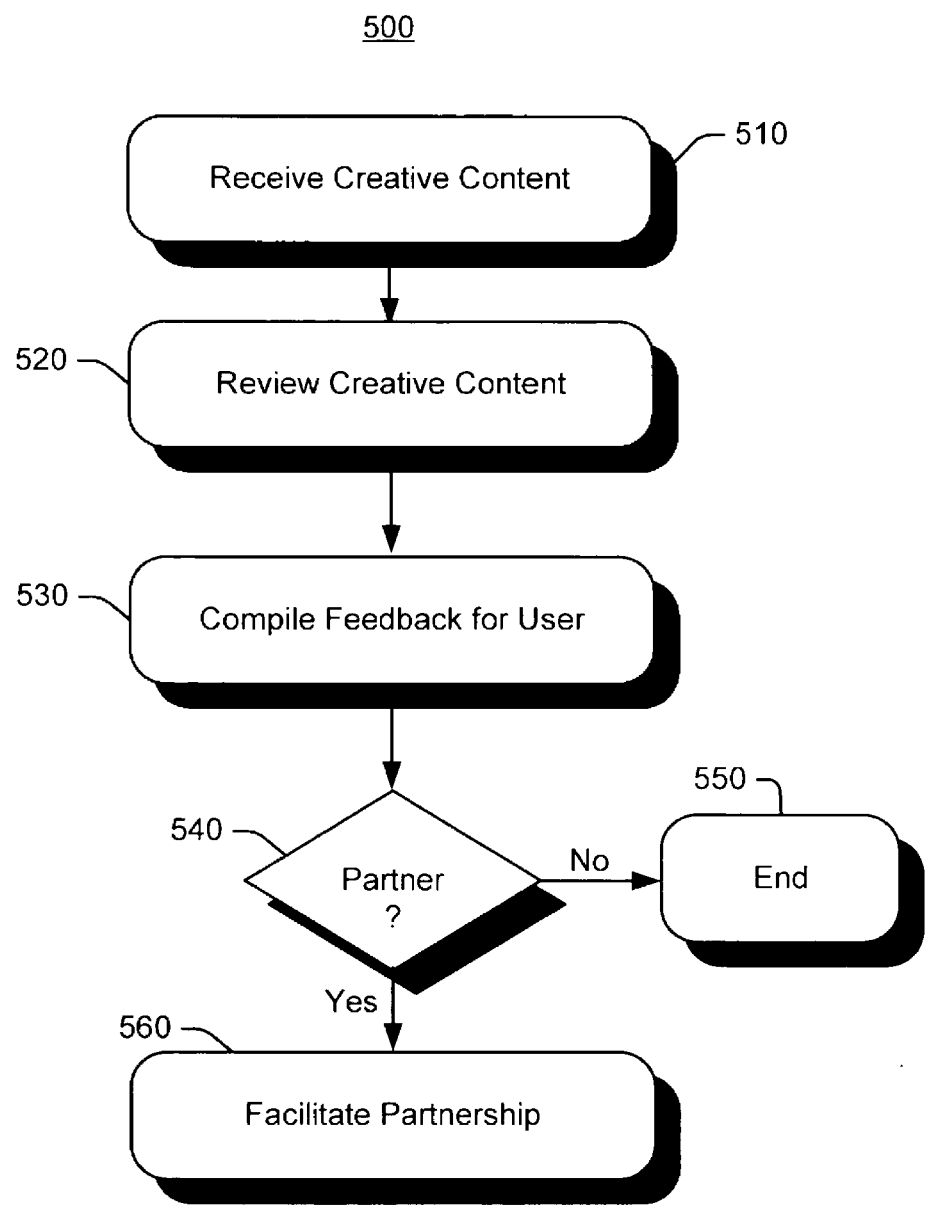
FIG. 5 is a flowchart illustrating exemplary operations which may be implemented by a broker service to have creative content reviewed.

FIG. 5 is a flowchart illustrating exemplary operations which may be implemented for having creative content reviewed. Operations 500 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used for brokering creative content online.

In operation 510, creative content may be received, e.g., by the broker service. For example, the creative content may be uploaded in electronic format over a networked computer system. In operation 520, the creative content may be provided to peer reviewers and/or contract reviewers. In an exemplary embodiment, reviewers may be self-categorized during a registration process thereby enabling the system to invite reviewers who have expressed an interest in the subject matter, have a particular background or experience with the subject matter, may be interested in purchasing the subject matter or representing the creator, etc.

In operation 525, feedback may be received from the reviewers, and in operation 530, the feedback may be compiled for the user. For purposes of illustration, reviewers may provide feedback via a standardized review form. The standardized review form may include a number of categories and enable the reviewer to indicate a score in each of the categories. For example, the reviewer may provide scores for a literary work on a scale of 1 to 10 in the following areas: writing style, plot, audience appeal, etc. Any number of categories may be provided, striking a balance between the time required to provide feedback and a review that is meaningful to the content creator. Although use of a standardized review form is not required, such use lends itself well to computerized compilation techniques, e.g., allowing the system to provide the content creator with standardized feedback (e.g., an overall score or content ranking). In other examples, the reviewers may provide written comments, marked-up versions containing comments and suggestions, etc.

In operation 540, a determination is made whether a content partner is interested in the creative content. Content partners may include potential buyers, distributors, agents, etc. In another example, another user accessing the broker service may express interest in the creative content posted online before, during, or after review. As explained above for the reviewers, content partners may also be self-categorized during a registration process thereby enabling the system to match creative content to content partners who have expressed an interest in the subject matter, have a particular background or experience with the subject matter, may be interested in purchasing the subject matter or representing the creator, etc.

If a content partner is not available for the creative content, operations may end at step 550. For example, the creative content may be returned to the user and/or removed from storage at the broker service. If a content partner is available for the creative content, the user may be matched with the content partner in operation 560. In an exemplary embodiment, the broker service may provide contact information to the content creator and/or content partner(s). In another exemplary embodiment, the broker service may provide "live" assistance with contract negotiations.

In an exemplary embodiment, a fee structure may also be implemented for one or more of the operations shown in FIG. 5. For purposes of illustration, a fee may be charged for accepting creative content in operation 510, e.g., to cover the cost of storage. Content creators may also be charged a fee to have their biography (links to their web page, etc.) posted online along with their creative content. A fee may also be charged for the review in operation 520. For example, the content creator may be charged a fee to skip peer review and have his or her creative content reviewed by contract reviewers. In addition, different fees may be charged for various levels of review, and or resubmitting the same creative content after it has been modified based on a previous review. A fee may also be charged for matching the content creator with a content partner and/or any follow-on deals brokered with content partners matched by the broker service. Alternatively, a portion of transaction fees (e.g., sales, contracts) may be collected for matching the user with a content partner. Content partners may also be charged a listing fee.

Figure 6:
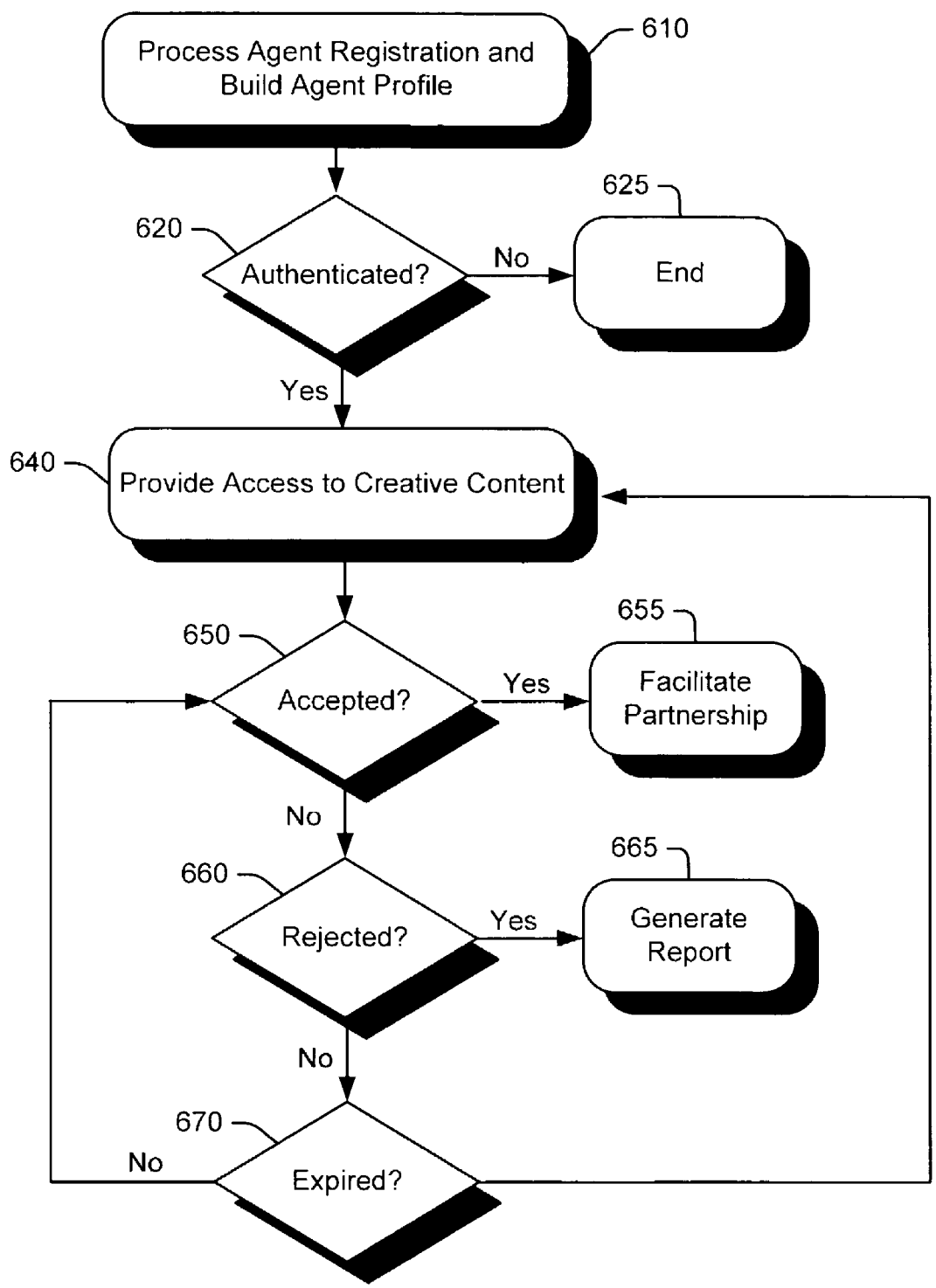
FIG. 6 is a flowchart illustrating exemplary operations which may be implemented by a broker service for matching an agent with creative content.

FIG. 6 is a flowchart illustrating exemplary operations 600 which may be implemented for matching an agent with creative content. An agent may be an independent agent (or agency) or a studio. The operations described below with reference to FIG. 6 may be implemented for independent agents (or agencies) and studios.

In operation 610, an agent registration may be received, e.g., by the broker service. For purposes of illustration, the agent registration may identify the agent (e.g., agency name, size, fees charged, etc.), provide agent qualifications (e.g., industry experience, industry memberships, prior success in the relevant industry, etc.), and identify content interest (e.g., genre and subcategories).

In operation 620, the agent may be authenticated. For example, the broker service may verify industry memberships and/or standing in the industry. If the agent cannot be authenticated, the broker service may allow the agent to clarify credentials or provide additional qualifications that can be verified. Alternatively, the agent registration may be rejected in operation 625.

In operation 630, an agent profile may be generated. In an exemplary embodiment, the agent profile may be based on processing of the agent registration (e.g., in operation 610). The agent profile may include, among other things, the type of content that the agent is seeking. The agent profile may also include an agent rank.

In operation 640, the agent may be provided access to creative content. In an exemplary embodiment, the agent may be matched with creative content based on the type of content the agent is seeking. For example, the agent profile may be used to match the agent with the desired type of creative content. The agent rank may also be used to provide higher ranking agents with access to the creative content before lower ranking agents. In another exemplary embodiment, the agent may be matched with creative content that has already been reviewed and recommended (e.g., by professional reviewers). This referral process may even be required by some agents (e.g., studios or well-regarded agencies).

In operation 650, a determination is made whether the agent has accepted (i.e., expressed an interest in) the creative content matched to the agent. If the agent has accepted the creative content, a partnership between the agent and the content creator may be facilitated in operation 655. If the agent has not accepted the creative content, a determination is made in operation 660 whether the agent has rejected the creative content.

If the agent has rejected the creative content, the broker service may generate a report for the content creator notifying the content creator of the rejection. The report may also include substantive commentary, e.g., for improving and resubmitting the creative content. Alternatively, if the agent has rejected the creative content, the broker service may return to operation 640 and match the agent with other creative content. The broker service may also deliver the rejected creative content to another agent for review (e.g., the next agent in the queue).

If the creative content has not been rejected yet, a determination is made in operation 670 whether a period of exclusivity for reviewing the creative content has expired. The period of exclusivity may be implemented so that the agent may review creative content before it is passed on to other agents. However, if the agent fails to act within a predetermined time (e.g., 5 business days, 1 week, 1 month, etc.) the broker service may automatically invite another agent for review (or return it to the creator). This period of exclusivity encourages the agent to review the creative content in a timely manner and helps keep the creative content "fresh" for other agents who may be positioned later in the queue.

It is noted that the period of exclusivity does not need to be the same for all creative content and may depend on various considerations. For example, the period of exclusivity may depend at least in part on the type of creative content. In another example, the period of exclusivity may depend at least in part on the content creator's reputation, or may even be assigned by the content creator. In addition, studios may have a longer time to review creative content because there are fewer studios than independent agents (or agencies).

If the period of exclusivity has expired, operations may return to operation 640 to match the agent with other creative content. Alternatively, operations may return to operation 650 so that the agent has an opportunity to review the creative content until the period of exclusivity expires.

Figure 7:
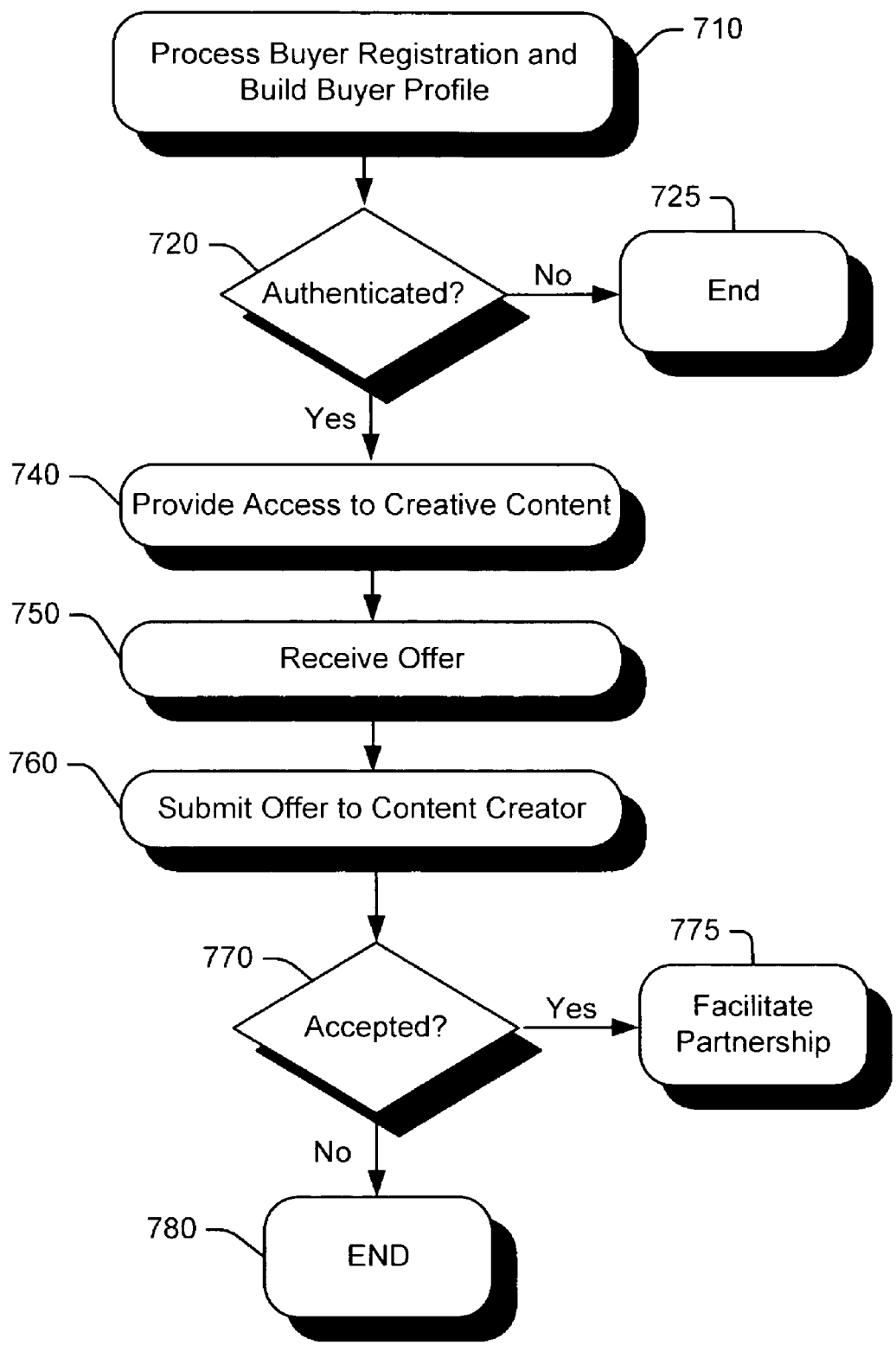
FIG. 7 is a flowchart illustrating exemplary operations which may be implemented by a broker service for selling creative content.

FIG. 7 is a flowchart illustrating exemplary operations 700 which may be implemented for bidding on creative content. In operation 710, the broker service may receive and process a buyer registration. As noted above, any user may register as a buyer, including users who are also registered as reviewers and/or agents. For purposes of illustration, the buyer registration may identify the buyer, e.g., by name. The buyer registration may also indicate whether the buyer is a volume buyer (e.g., studio or gallery) and may specify a price range. The buyer registration may also identify content interest (e.g., genre and subcategories).

In operation 720, the buyer may be authenticated. The broker service may independently authenticate the buyer, e.g., based on prior purchases, or may use external indicators, such as eBay® Internet auction service user ratings. If the buyer cannot be authenticated, e.g., due to a poor payment history, the buyer registration may be rejected.

In operation 730, a buyer profile may be generated. In an exemplary embodiment, the buyer profile may be based on processing of the buyer registration (e.g., in operation 710). The buyer profile may include, among other things, the type of content that the buyer is seeking. The buyer profile may also include a buyer rank.

It is noted that the buyer profile may be used by both the broker service to match the buyer with creative content that interests the buyer, and by the content creator. For example, the content creator may accept a lower bid from a gallery owner over a higher bid from an individual, in the hopes of doing future business with the gallery owner. In another example, the content creator may only accept bids from buyers having a buyer rank that meets a predetermined threshold (e.g., 4 out of 5 stars).

In operation 740, one or more buyer may be provided access to creative content. In an exemplary embodiment, the buyer may be matched with creative content based on the type of content the buyer is seeking. For example, the buyer profile may be used to match the buyer with the desired type of creative content. The buyer rank may also be used to provide higher ranking buyers with creative content before lower ranking buyers. In another exemplary embodiment, discerning buyers may also be provided with a review and/or recommendation to buy the creative content (e.g., from professional reviewers).

In operation 750, the broker service may receive one or more bids to buy creative content that has been submitted to the buyers (e.g., in operation 740). In operation 760 the bids may be provided to the content creator to accept or reject. If a bid is accepted in operation 770, a sale between the buyer and the content creator may be facilitated in operation 775. If the bid has not been accepted, the buyer may be notified and operations may end at 780.

Optionally, the content creator may provide a counter-offer to a buyer's bid. The broker service may provide the counter-offer to the buyer for consideration, and a sale may be arranged if the buyer accepts the counter-offer.

Also optionally, operations 700 for bidding on creative content may include a period of exclusivity. According to an exemplary embodiment, creative content may be provided to one or more buyers to bid on before being provided to other buyers (e.g., based on rank). For example, the content creator may request bids first from gallery owners, before opening bidding to other buyers.

The operations shown and described herein are provided to illustrate exemplary implementations of brokering creative content online. It is noted that the operations are not limited to the ordering shown. Still other operations may also be implemented for brokering creative content online.

Exemplary Computing Device

Figure 8:
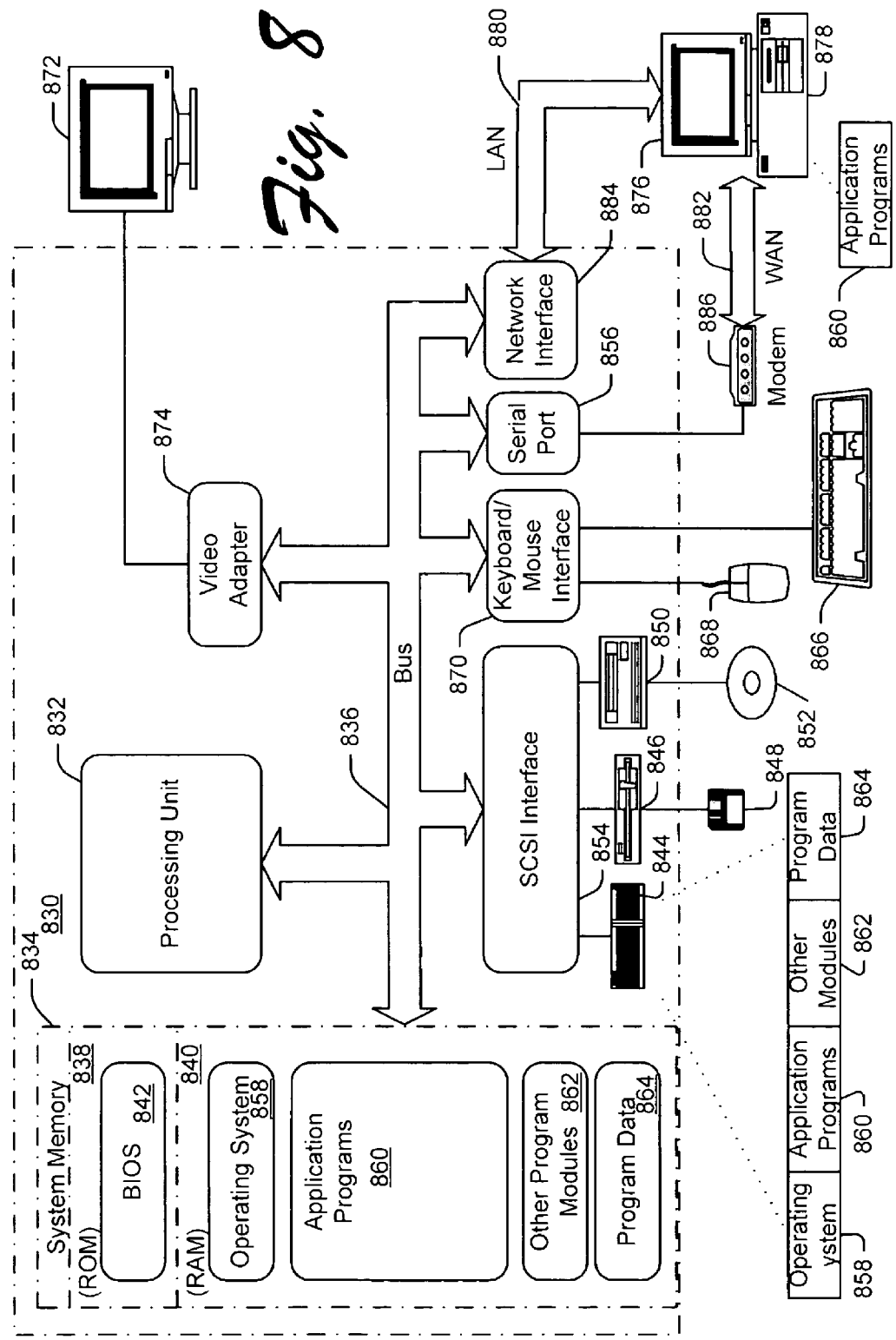
FIG. 8 is a schematic illustration of an exemplary computing device that may be utilized for brokering creative content online.

FIG. 8 is a schematic illustration of an exemplary computing device that can be utilized for brokering creative content online. Computing device 830 includes one or more processors or processing units 832, a system memory 834, and a bus 836 that couples various system components including the system memory 834 to processors 832. The bus 836 represents one or more of any of several types of bus structures, including a memory bus or memory controller, a peripheral bus, an accelerated graphics port, and a processor or local bus using any of a variety of bus architectures. The system memory 834 includes read only memory (ROM) 838 and random access memory (RAM) 840. A basic input/output system (BIOS) 842, containing the basic routines that help to transfer information between elements within computing device 830, such as during start-up, is stored in ROM 838.

Computing device 830 further includes a hard disk drive 844 for reading from and writing to a hard disk (not shown), and may include a magnetic disk drive 846 for reading from and writing to a removable magnetic disk 848, and an optical disk drive 850 for reading from or writing to a removable optical disk 852 such as a CD ROM or other optical media. The hard disk drive 844, magnetic disk drive 846, and optical disk drive 850 are connected to the bus 836 by a SCSI interface 854 or some other appropriate interface. The drives and their associated computer-readable media provide nonvolatile storage of computer-readable instructions, data structures, program modules and other data for computing device 830. Although the exemplary environment described herein employs a hard disk, a removable magnetic disk 848 and a removable optical disk 852, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 844, magnetic disk 848, optical disk 852, ROM 838, or RAM 840, including an operating system 858, one or more application programs 860, other program modules 862, and program data 864. A user may enter commands and information into computing device 830 through input devices such as a keyboard 866 and a pointing device 868. Other input devices (not shown) may include a microphone, joystick, game pad, satellite dish, scanner, or the like. These and other input devices are connected to the processing unit 832 through an interface 870 that is coupled to the bus 836. A monitor 872 or other type of display device is also connected to the bus 836 via an interface, such as a video adapter 874.

Computing device 830 may operate in a networked environment using logical connections to one or more remote computers, such as a remote computer 876. The remote computer 876 may be a personal computer, a server, a router, a network PC, a peer device or other common network node, and typically includes many or all of the elements described above relative to computing device 830. The logical connections depicted include a LAN 880 and a WAN 882.

When used in a LAN networking environment, computing device 830 is connected to the local network 880 through a network interface or adapter 884. When used in a WAN networking environment, computing device 830 typically includes a modem 886 or other means for establishing communications over the wide area network 882, such as the Internet. The modem 886, which may be internal or external, is connected to the bus 836 via a serial port interface 856. In a networked environment, program modules depicted relative to the computing device 830, or portions thereof, may be stored in the remote memory storage device. It will be appreciated that the network connections shown are exemplary and other means of establishing a communications link between the computers may be used.

Generally, the data processors of computing device 830 are programmed by means of instructions stored at different times in the various computer-readable storage media of the computer. Programs and operating systems may distributed, for example, on floppy disks, CD-ROMs, or electronically, and are installed or loaded into the secondary memory of a computer. At execution, the programs are loaded at least partially into the computer's primary electronic memory.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method of partnering content creators with content partners, comprising:
   receiving registration information at a registration module from a content partner and building a profile describing desired creative content for the content partner;
   receiving creative content in a computer readable storage;
   receiving at least one review of the creative content via an interface, and computing a score based on the at least one review;
   based on at least the profile and the score exceeding a predetermined threshold, determining by a partner engine whether a match exists between a content partner and the creative content; and
   when a match is found, providing by the partner engine the content partner access to the creative content; and
   when a match is found, extending by the partner engine an invitation for the content partner to acquire rights in the creative content;
   withdrawing access to the creative content from the content partner when a period of exclusivity expires, wherein the period of exclusivity provides the creative content exclusively to the content partner for a predetermined time bet inviting other content partners to review the creative content; and
   providing access to the creative content to another content partner positioned lower in a queue of content partners than the content partner having the period of exclusivity, wherein the access to the creative content to another content partner is provided after the period of exclusivity expires.

2. The method of claim 1 wherein rights in the creative content includes one or more of: right of reproduction, right of adaptation, right of distribution, right of performance, right of display, right of agency, and right of ownership.

3. The method of claim 1 wherein the content partner includes one or more of: a buyer, an agent, and a studio.

4. The method of claim 1, further comprising:
   wherein the receiving creative content further comprises categorizing the creative content into one or more content categories, and
   wherein the match is determined by matching one or more content categories with one or more profiles.

5. The method of claim 1 wherein when a review is associated with the creative content providing the content partner access to the creative content further includes granting the content partner access to the review.

6. The method of claim 1 further comprising:
   receiving an offer from the content partner to acquire a right in the creative content;
   communicating the offer to the content creator; and
   receiving acceptance from the content creator.

7. The method of claim 1 further comprising generating a report for the content creator when the content partner rejects the creative content, the report including substantive commentary for improving the creative content for resubmission.

8. The method of claim 1 wherein providing access to the creative content is based at least in part on a rank of the content partner, wherein higher-ranked content partners receive creative content for a period of exclusivity before lower-ranked content partners.

9. The method of claim 8 wherein the rank is determined based on a subscription level purchased by the content partner, wherein a higher rank corresponds to a higher cost subscription level and a lower rank corresponds to a lower cost subscription.

10. The method of claim 8 wherein the rank is determined based on feedback from content creators.

11. The method of claim 8 wherein the rank is determined based on a number of rights acquired from different content creators.

12. The method of claim 1 wherein providing access to the creative content is based at least in part on a history of the content partner.

13. The method of claim 1, wherein the invitation includes sending an email to the content partner.

14. A system for partnering content creators with content partners online, the system including a computer readable medium storing program code executable by a processor, the program code comprising:
   a registration module for receiving registration information from a plurality of content partners;
   a processing module for building a profile describing desired creative content; and
   a score based on at least one review of the creative content;
   a partner engine determining whether a match exists between a content partner and creative content received from a user based on at least the profile and the score exceeding predetermined threshold, and the partner engine both providing access to the creative content and extending an invitation for the content partner to acquire rights in the creative content when a match is found;
   the partner engine is further programmed to withdraw access to the creative content from the content partner when a period of exclusivity expires, wherein the period of exclusivity provides the creative content exclusively to the content partner for a predetermined time before inviting other content partners to review the creative content; and the partner engine is further programmed to provide access to the creative content to another content partner positioned lower in a queue of content partners than the content partner having the period of exclusivity, wherein the access to the creative content to another content partner is provided after the period of exclusivity expires.

15. The system of claim 14 wherein the content partner includes one or more of: a buyer, an agent, and a studio.

16. The system of claim 14 further comprising a content manager for categorizing the creative content into one or more content categories, and wherein the partner engine determines whether a match exists by comparing one or more content categories with one or more profiles.

17. The system of claim 14 wherein the partner engine provides the content partner with access to a review associated with the creative content.

18. The system of claim 14 further comprising an interface for receiving an offer from the content partner to acquire a right in the creative content, the interface communicating the offer to the content creator, and the interface receiving acceptance of the offer from the content creator.

19. The system of claim 14 further comprising a period of exclusivity for the creative content, wherein the partner engine withdraws access to the creative content from the content partner when the period of exclusivity expires.

20. The system of claim 14 further comprising a period of exclusivity for the creative content, wherein the partner engine provides access to the creative content to another content partner when the period of exclusivity expires.

21. The system of claim 14 further comprising an I/O module for providing a report to the content creator when the content partner rejects the creative content.

22. The system of claim 14 further comprising a rank of the content partner, wherein access to the creative content is based at least in part on the rank.

23. The system of claim 22 wherein the rank: is based on a subscription purchased by the content partner.

24. The system of claim 22 wherein the rank is based on user feedback.

25. The system of claim 22 wherein the rank is based on a number of rights acquired by the content partner.

26. The system of claim 22 wherein the rank is based on a history of the content partner.

27. The method of claim 1, further comprising charging a fee for the content creators to skip peer review and have the creative content reviewed by contract reviewers.

28. The method of claim 1, wherein the period of exclusivity is a different time for different types of creative content.

* * * * *

UNITED STATES PATENT AND TRADEMARK OFFICE
CERTIFICATE OF CORRECTION

PATENT NO. : 7,921,028 B2  Page 1 of 1
APPLICATION NO. : 11/103696
DATED : April 5, 2011
INVENTOR(S) : Douglas W. Cole It is certified that error appears in the above-identified patent and that said Letters Patent is hereby corrected as shown below:

In column 13, line 59, in Claim 1, delete "bet" and insert -- before --, therefor.

In column 14, line 60, in Claim 14, delete "predetermined" and insert -- a predetermined --, therefor.

In column 16, line 13, in Claim 23, delete "rank:" and insert -- rank --, therefor.

Signed and Sealed this
Thirteenth Day of September, 2011

David J. Kappos
*Director of the United States Patent and Trademark Office*